(No Model.)
E. THOMSON.
METHOD OF MEASURING ELECTRIC CURRENTS.
No. 456,172. Patented July 21, 1891.
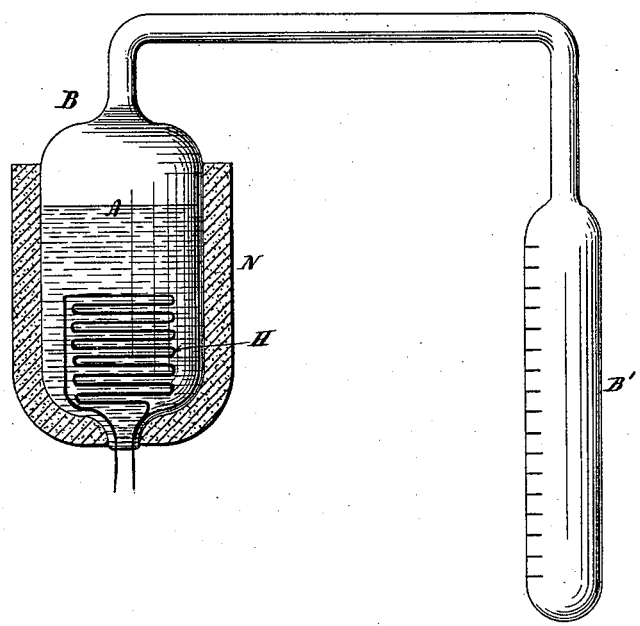
Witnesses:
D. W. Gardner
Wm. H. Capel
Inventor:
Elihu Thomson
By his Attorney,
H. C. Townsend

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

METHOD OF MEASURING ELECTRIC CURRENTS.

SPECIFICATION forming part of Letters Patent No. 456,172, dated July 21, 1891.

Original application filed October 19, 1887, Serial No. 252,793. Divided and this application filed May 27, 1889. Serial No. 312,213. (No model.)

*To all whom it may concern:*

Be it known that I, ELIHU THOMSON, a citizen of the United States, and a resident of Lynn, in the county of Essex and State of Massachusetts, have invented a certain new and useful Method of Measuring Electric Currents, of which the following is a specification.

My present invention relates to a method of measuring a current of electricity; and it consists, essentially, in employing an electrical current to generate heat, vaporizing a liquid by the heat generated, and noting the amount of vaporization as a measure of the electricity employed.

In carrying out my invention I prefer to generate the heat required by passing the current through an electric conductor which resists its passage, although I do not limit myself to this way, there being other ways known to electricians whereby an electric current, especially if it be an alternating current, may be made to develop heat by an electrical or magnetic action. The heat so generated may be applied in any suitable way directly to the liquid to be vaporized, which liquid may be of any kind suitable for the purpose—as, for instance, alcohol. The amount vaporized and constituting a measure of the electric current may be noted by any desired means, though I prefer to ascertain or note such amount by condensing it in a suitable chamber and measuring the amount condensed.

In the accompanying drawing I have shown in vertical section a form of apparatus that may be used in practicing my invention.

B is a bulb or receptacle of glass or other suitable material containing alcohol A or other vaporizable fluid which has been well boiled in the bulb and sealed in such bulb while the vapor is escaping, thus producing in the space above or beyond the liquid an alcohol vapor at the tension due to the temperature, no air being present, or very little.

Within the bulb is an electric conductor H, connected with outside conductors by wires sealed in the bulb. The conductor H may be of platinum wire of small gage, so as to be readily heated by the current.

N is a sheath or cover for the bulb and is designed to prevent the escape of heat. The vapors produced by the heating of the liquid pass from the receptacle to a chamber B', in which they are condensed and collected as liquid. A suitable scale applied as shown permits the amount of liquid condensed to be noted.

The apparatus described is not claimed herein, as it is contained in a prior application filed by me October 19, 1887, Serial No. 252,793, of which the present application forms a division.

What I claim as my invention is—

1. The herein-described method of measuring electricity, consisting in generating heat by the electric current, evaporating a liquid by the heat so generated, and noting the amount of evaporation to ascertain the amount of current that has passed through the heat-generator.

2. The herein-described method of measuring electricity, consisting in passing an electric current through a conductor and thereby heating the same, vaporizing a liquid by the heat so generated, and measuring or noting the amount of vaporization.

3. The herein-described method of measuring electricity, consisting in generating heat by the electric current, utilizing the heat to vaporize a liquid, condensing the vapor produced, and noting the amount of condensation.

Signed at Lynn, in the county of Essex and State of Massachusetts, this 25th day of May, A. D. 1889.

ELIHU THOMSON.

Witnesses:
J. W. GIBBONEY,
W. O. WAKEFIELD.